Aug. 7, 1928. 1,679,974

D. JEWELL

TRANSMISSION MECHANISM

Original Filed April 8, 1924

Inventor
Danford Jewell

By Herbert E. Smith
Attorney

Patented Aug. 7, 1928.

1,679,974

UNITED STATES PATENT OFFICE.

DANFORD JEWELL, OF SPOKANE, WASHINGTON, ASSIGNOR OF ONE-HALF TO HARVE H. PHIPPS, OF SPOKANE, WASHINGTON.

TRANSMISSION MECHANISM.

Application filed April 8, 1924, Serial No. 704,931. Renewed April 23, 1928.

My present invention relates to improvements in transmission mechanism especially adapted for use on motor vehicles and applied directly to the traction wheel for the purpose of propelling the vehicle.

The invention resides in the combination and arrangement of parts at the end of the shaft or axle, (which may be fixed or rotatable) with a driven traction wheel loose on the axle, of complementary gears and pinions forming a transmission mechanism between the shaft and wheel whereby a positive drive is attained for the wheel and elimination of back lash is secured. In accomplishing these results an increased efficiency in the application of power to the wheel is provided, and a smooth and regular transmission of power is insured.

The invention consists in certain novel combinations and arrangements of parts between the driving member of the transmission mechanism and the driven traction wheel as will hereinafter more fully be described. In the accompanying drawings one complete example of the physical embodiment of my invention is illustrated wherein the parts are combined and arranged in accordance with the best mode I have thus far devised for the practical application of the principles of my invention.

Figure 1:
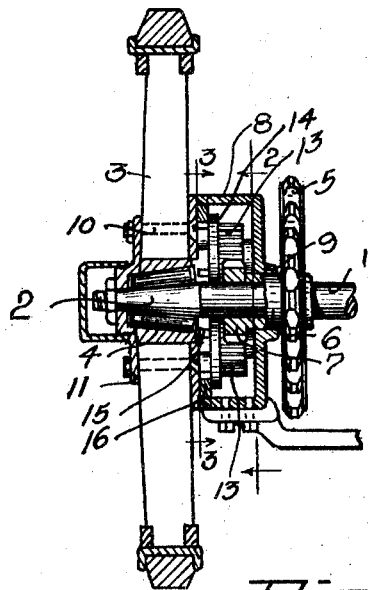
Figure 1 is a transverse vertical sectional view through an automobile wheel as at line 1—1 of Figure 2, showing the application thereto of my invention.

In order that the mode of carrying out my invention may readily be understood I have illustrated a portion of a shaft or axle 1 of an automotive vehicle, which member may be rotatable in bearings in the vehicle frame, or may be rigid with relation thereto. The tapered journal end 2 of the shaft supports the traction wheel 3 which may be of standard or usual type and is provided with roller bearings 4 arranged in customary manner.

A driving sprocket 5 which may receive power from a suitable source through the medium of a sprocket chain not shown, forms the driving member of the transmission mechanism, and this sprocket wheel is preferably rigid or integral with a sleeve 6, here illustrated as loose on the shaft or axle 1. The driving sprocket and its sleeve carry a driving pinion 7, and these three members preferably are loose on the axle 1, but are rigidly connected to revolve together on the axle. Between the driving sprocket and the traction wheel is arranged a cylindrical cup or housing 8, in which the sleeve 6 has a bearing at 9, and the housing is firmly and rigidly secured to one of the longitudinally disposed springs, not shown. Bolts 10 pass through spokes of the wheel and secure the inner plate 10ᵃ to the flanged hub cap or plate 11 at the exterior of the wheel 3.

The driving pinion 7 is located within the fixed housing 8 between its inner wall and its outer wall 10ᵃ, the latter being secured by bolts 10 to the wheel, and at the outer side of the inner fixed wall of the housing are a series of diametrically arranged laterally extending studs 12 fixed to the housing and projecting toward the wheel 3. These studs are spaced equidistant from the axle 1 and from each other, and each stud has journaled thereon a transmission pinion 13 all of which are geared to the driving pinion 7 of the sprocket 5, and located within the housing.

With each pinion 13 is rigidly secured a circular disk 14 located between the pinion and the traction wheel and within the housing, and said disks, on their faces adjacent to the traction wheel 3, are each fashioned with a series of pins 15, here shown as four in number. The pins are arranged diametrically about the centers of the disks and project laterally therefrom toward the traction wheel.

The pins are designed to co-act with a driven plate 16 which is fixed to the wheel 3 within the housing and is fashioned as an internal gear wheel. The plate is provided with inwardly radiating spurs or teeth 17 between which are provided recesses or notches 18 through which the pins of the disks travel.

Figure 2:
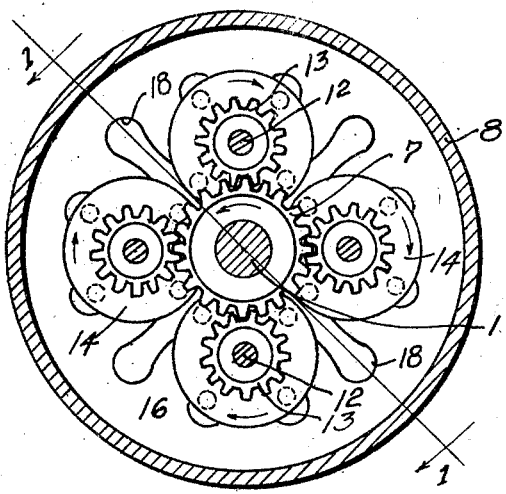
Figure 2 is a sectional view at line 2—2 of Figure 1.
Figure 3:
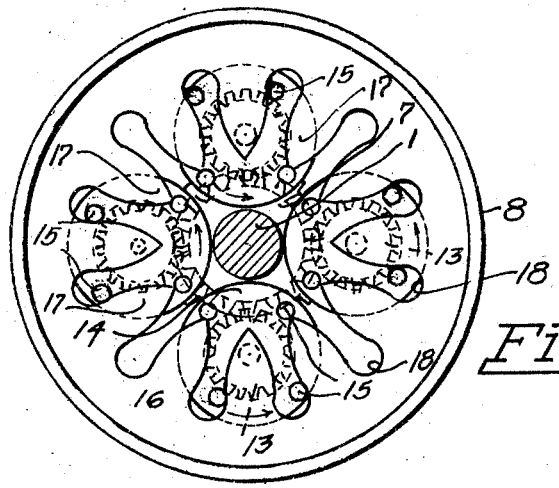
Figure 3 is a vertical sectional view at line 3—3 of Figure 1.

The rotation of the several parts of the transmission mechanism is illustrated by arrows in Figure 2 and also in Figure 3.

The power is applied to the sprocket wheel 5, which may or may not, as before stated, be fixed to the shaft or axle 1, depending upon whether or not the axle is rotatable, and the power is transmitted through the sleeve and driving pinion to the several radially disposed pinions 13. The transmission of power through the driving pinion and driven pinions to the disks and their pins causes the rotation of the wheel through the action of the pins in the internal gear or plate 16, the latter being carried by the wheel.

It will be apparent that the wide area over which the power is distributed through the internal gear plate from the pins of the disks results in a positive rotary movement of the wheel 3. This distribution of power is secured at a multiplicity of points by the utilization of the disks and their pins in co-action with the teeth of the internal gear resulting in a smooth and stable rotary movement of the parts. The pins may have anti-friction rollers or sleeves thereon to perform the function of wear members as well as to reduce friction, and it will be obvious that grease or lubricant will be maintained in the housing for lubrication of the parts.

Having thus fully described my invention, what I claim as new and desire to secure by Letters Patent is—

The combination with a shaft and traction wheel journaled thereon, an internal gear carried by said wheel, of a fixed housing inclosing the gear, a sleeve journaled on the shaft having a bearing within the housing, an exterior driving sprocket and an interior driving pinion integral with the sleeve, a series of studs fixed in said housing and driven pinions journaled thereon, an integral disk for each pinion, and a plurality of diametrically spaced pins on each disk for co-action with said internal gear.

In testimony whereof I affix my signature.

DANFORD JEWELL.